United States Patent
Fujikawa et al.

(10) Patent No.: US 8,295,053 B2
(45) Date of Patent: Oct. 23, 2012

(54) MOUNTING COMPONENT AND ELECTRONIC APPARATUS

(75) Inventors: Hideyuki Fujikawa, Kawasaki (JP); Hirokatsu Kato, Oota-ku (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 13/064,620

(22) Filed: Apr. 4, 2011

(65) Prior Publication Data

US 2011/0182044 A1 Jul. 28, 2011

Related U.S. Application Data

(63) Continuation of application No. PCT/JP2008/068209, filed on Oct. 7, 2008.

(51) Int. Cl.
*H05K 5/00* (2006.01)
(52) U.S. Cl. ............... 361/752; 361/679.33; 361/724; 439/157; 439/247; 439/378; 29/592.1; 29/729; 29/740; 29/832
(58) Field of Classification Search ............... 361/752, 361/679.33, 724; 439/157, 247, 378; 29/592.1, 29/729, 740, 832
See application file for complete search history.

(56) References Cited

FOREIGN PATENT DOCUMENTS

| JP | 2001-156466 | 6/2001 |
|---|---|---|
| JP | 2003-198153 | 7/2003 |
| JP | 2008-077806 | 4/2008 |

OTHER PUBLICATIONS

International Search Report for PCT/JP2008/068209, Mailed Jan. 20, 2009.

*Primary Examiner* — Xiaoliang Chen
(74) *Attorney, Agent, or Firm* — Staas & Halsey LLP

(57) ABSTRACT

A mounting component includes a fixed frame to be fixed to a board and a sliding frame. The fixed frame includes first and second fixed side plates having through holes formed in positions corresponding to engaging holes of an electronic component, and first and second fixed arms connecting the first and second fixed side plates. The sliding frame includes first and second sliding side plates including engaging pins to be inserted via the through holes into the engaging holes of the electronic component, first and second sliding arms extending from the front and back ends of the first sliding side plate, and third and fourth sliding arms extending from the front and back ends of the second sliding side plate. The first, second, third, and fourth sliding arms are configured to slide the first and second sliding plates away from the first and second fixed side plates.

12 Claims, 10 Drawing Sheets

MOUNTING COMPONENT AND ELECTRONIC APPARATUS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2008/068209, filed on Oct. 7, 2008, the entire contents of which are incorporated herein by reference.

FIELD

The embodiments discussed herein are related to a mounting component and an electronic apparatus.

BACKGROUND

An electronic apparatus such as a personal computer (PC) often includes an electronic component, e.g., a hard disk drive (HDD), having a substantially-rectangular plate-like shape in plan view and having engaging holes formed in the side surfaces. Such an electronic component is generally mounted on a board of the electronic apparatus via a mounting component to make it easier to mount and replace the electronic component. For example, a fixing bracket for mounting an HDD is disclosed (see, for example, Japanese Laid-Open Patent Publication No. 2001-156466 and Japanese Laid-Open Patent Publication No. 2003-198153). The disclosed fixing bracket includes two metal parts that slide relative to each other to sandwich the HDD, and the metal parts include pins to be inserted into engaging holes of the HDD. With the fixing bracket, it is possible to fix the HDD by inserting the pins into the engaging holes instead of by using screws. Thus, the fixing bracket makes it easier to mount and replace the HDD.

SUMMARY

According to an aspect of the invention, there is provided a mounting component for mounting an electronic component on a board. The mounting component includes a fixed frame to be fixed to the board and a sliding frame. The fixed frame includes first and second fixed side plates having through holes formed in positions corresponding to engaging holes formed in side surfaces of the electronic component, and first and second fixed arms configured to connect the front ends and the back ends of the first and second fixed side plates. The sliding frame includes first and second sliding side plates disposed at outer sides of the corresponding first and second fixed side plates and including engaging pins that are to be inserted into the engaging holes of the electronic component via the through holes of the first and second fixed side plates, first and second sliding arms that extend from the front and back ends of the first sliding side plate toward the second sliding side plate, and third and fourth sliding arms that extend from the front and back ends of the second sliding side plate toward the first sliding side plate. The first, second, third, and fourth sliding arms are configured to slide the first and second sliding plates away from the first and second fixed side plates.

The object and advantages of the invention will be realized and attained by means of the elements and combinations particularly pointed out in the claims.

It is to be understood that both the foregoing general description and the followed detailed description are exemplary and explanatory and are not restrictive of the invention as claimed.

DESCRIPTION OF EMBODIMENTS

One problem with the above-described fixing bracket is that if the metal parts come loose and a gap is formed between the metal parts and the HDD, the HDD may shake between the metal parts.

An aspect of this disclosure provides a mounting component and an electronic apparatus that make it possible to securely fix and easily mount and replace an electronic component.

Preferred embodiments of the present invention are described below with reference to the accompanying drawings.

Figure 1:
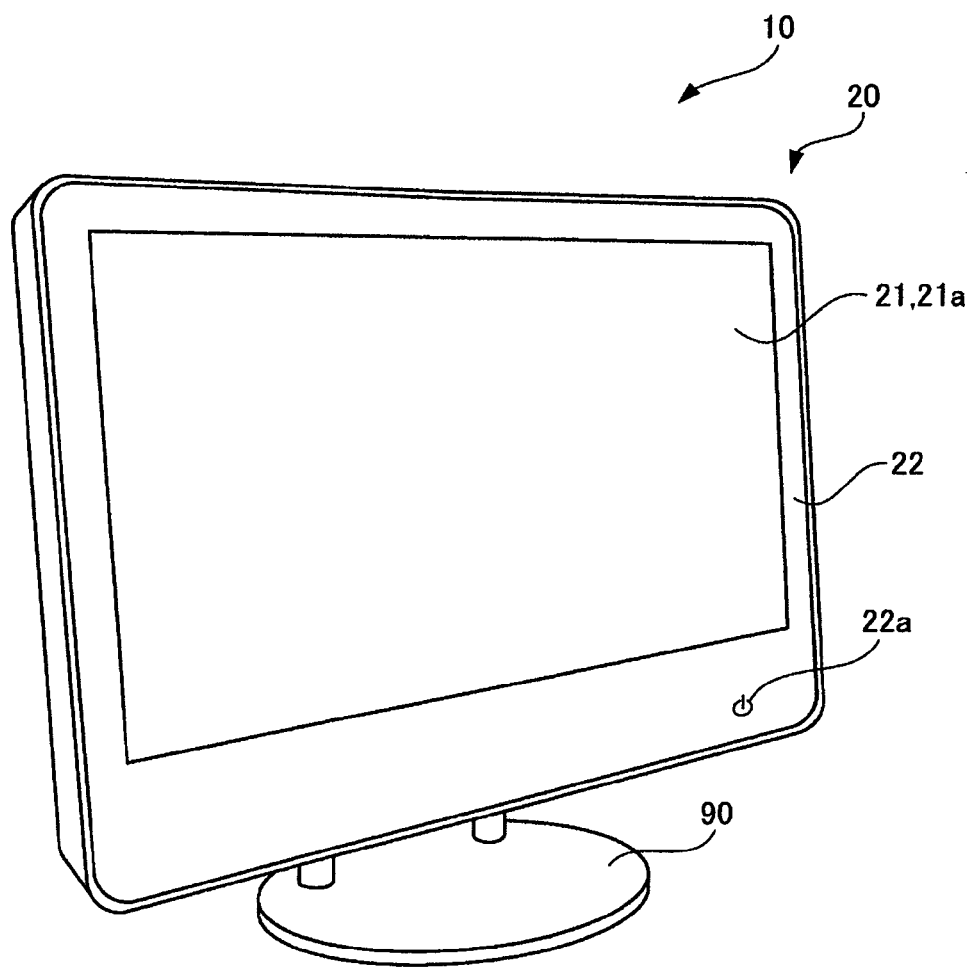
FIG. 1 is a front view of a personal computer.
Figure 2:
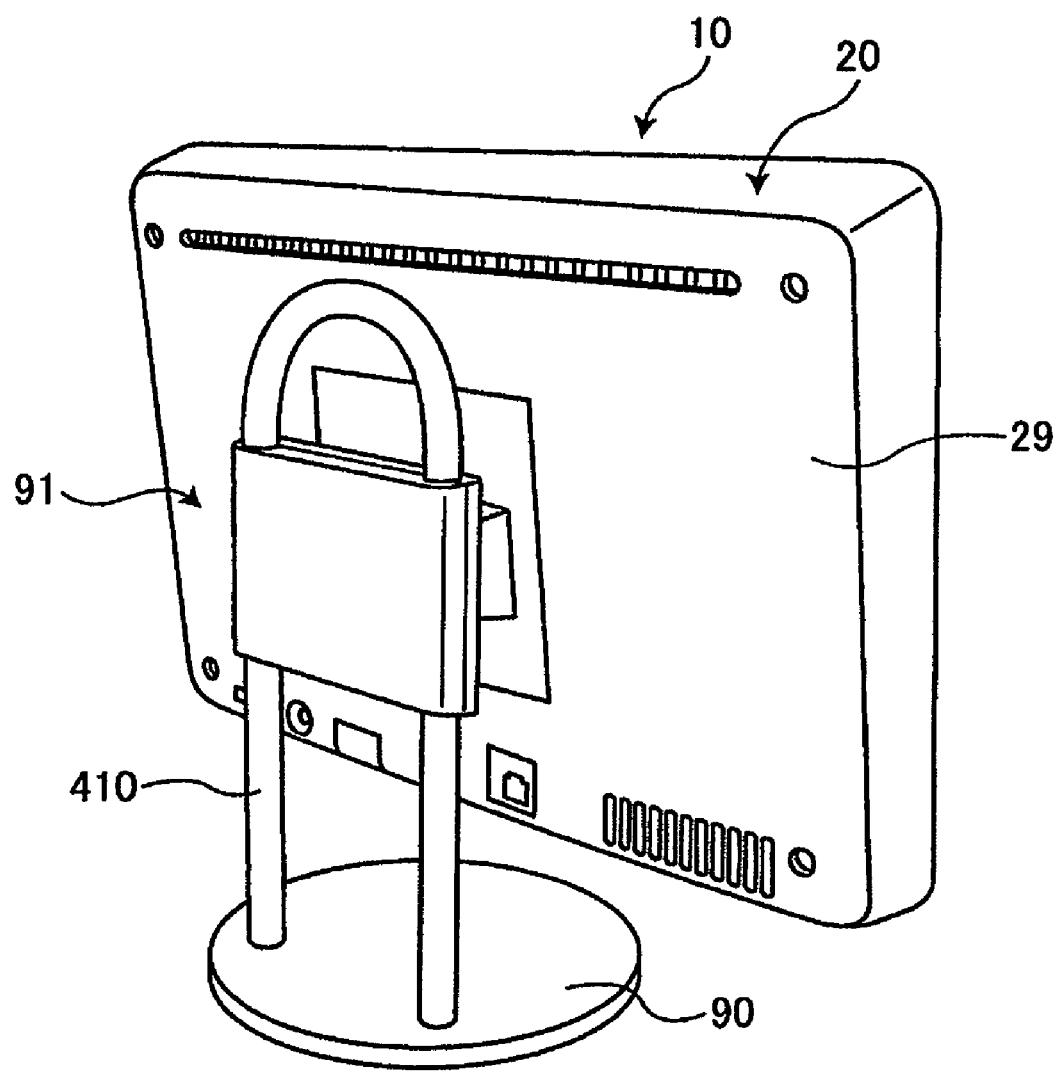
FIG. 2 is a rear view of the personal computer of FIG. 1.

FIG. 1 is a front view of a personal computer (PC) 10 and FIG. 2 is a rear view of the PC 10.

The PC 10 includes a main body 20. The main body 20 includes a display panel 21 having a display screen 21a. The outer front surface of the main body 20 is formed by the display screen 21a and a front frame 22 surrounding the display screen 21a. An icon 22a is formed by silk-screen printing on a lower part of the front frame 22. The icon 22a represents a power button. Touching the icon 22a with a finger turns on the main body 20.

Arithmetic circuitry including a central processing unit (CPU) is provided in the housing of the main body 20 at a position behind the display panel 21.

Thus, when an input unit such as a keyboard is provided, the PC 10 can provide general functions of a personal computer.

The back side of the housing of the main body 20 is covered by a rear cover 29. Although a power connector and other connectors are provided on the back side of the housing of the main body 20, their descriptions are omitted here.

The PC 10 further includes a rotating platform 90 and a support mechanism 91 for supporting the back side of the main body 20. The rotating platform 20 allows the user to turn the display screen 21a of the main body 20. The supporting mechanism 91 allows the user to hold the main body 20 at a desired height.

Figure 3:
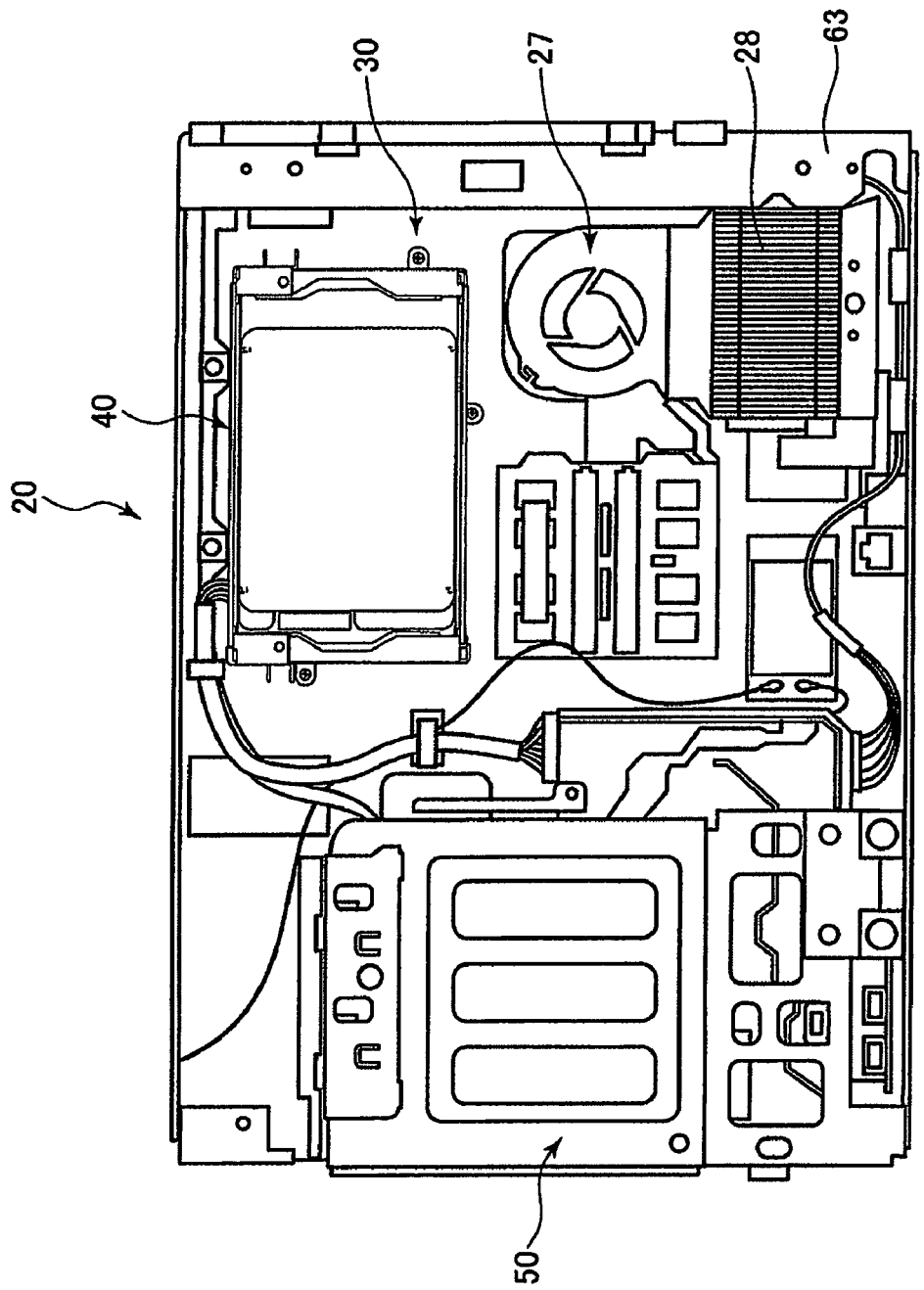
FIG. 3 is a drawing illustrating an internal configuration of the personal computer of FIG. 1.

FIG. 3 is a drawing illustrating an internal configuration of the main body 20 with the rear cover 29 removed.

As illustrated in FIG. 3, the main body 20 includes a motherboard 30, a hard disk drive (HDD) unit 40, and an optical disk unit 50. The motherboard 30 includes the CPU and occupies a large area in the housing. The HDD unit 40 is placed on the motherboard 30. The optical disk unit 50 is connected via a cable to the motherboard 30. The main body 20 also includes a fan 27 and a radiating fin 28. The fan 27 forcibly evacuate air from the housing.

Figure 4:
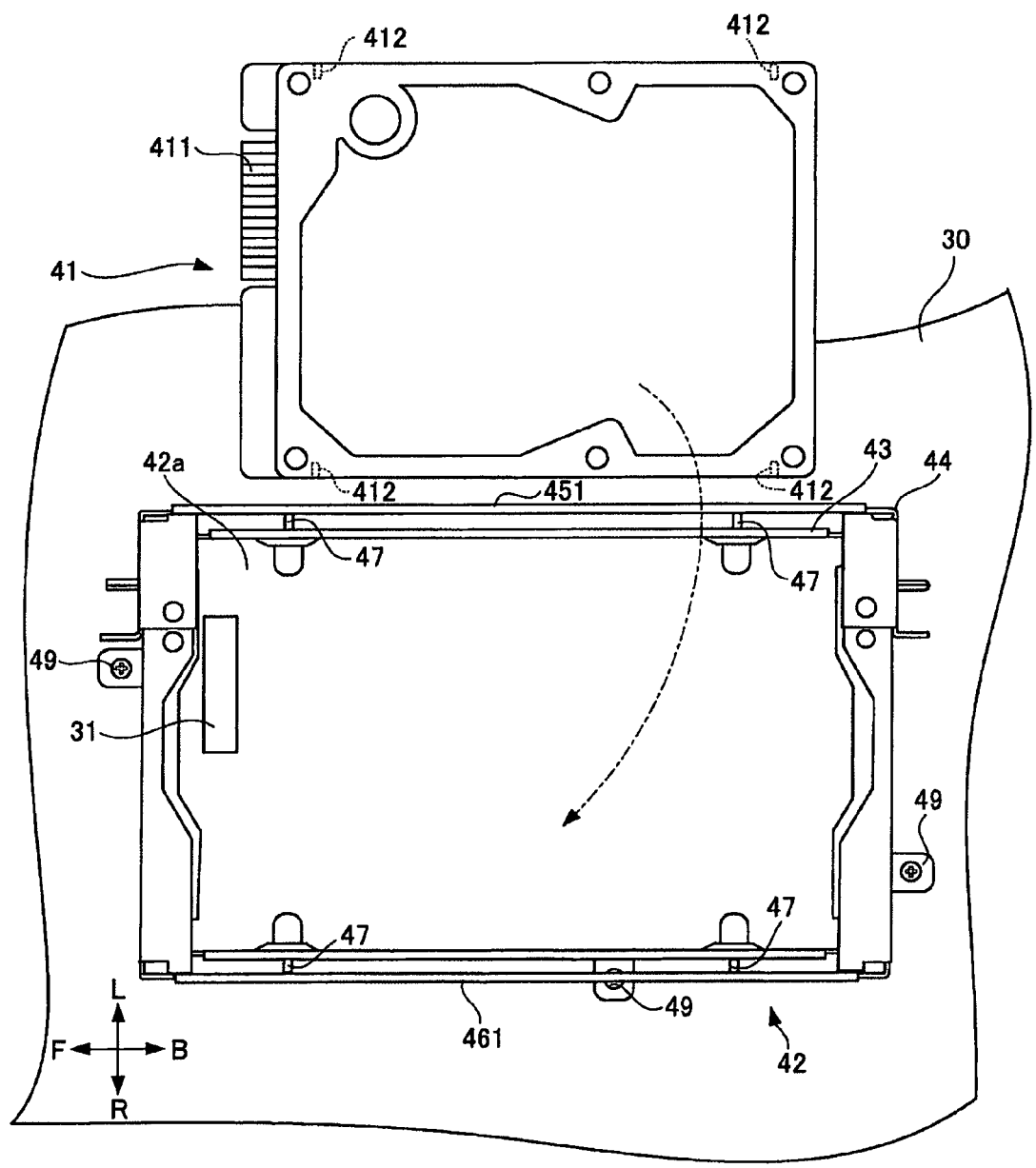
FIG. 4 is a drawing illustrating a part of a motherboard, a hard disk drive, and a mounting component.

FIG. 4 is a drawing illustrating a part of the motherboard 30, a hard disk drive (HDD) 41, and a mounting component 42. The HDD unit 40 illustrated in FIG. 3 is a combination of the HDD 41 and the mounting component 42. In FIG. 4, the HDD 41 is separated from the mounting component 42 and the motherboard 30.

Here, the HDD 41 is used as an example of the electronic component described above.

The HDD 41 has a substantially-rectangular plate-like shape in plan view and has two engaging holes 412 in each of two side surfaces. Also, the HDD 41 includes an HDD connector 411.

In the descriptions below, a front side (F) indicates the side of the HDD 41 where the HDD connector 411 is provided, a back side (B) indicates the side of the HDD 41 opposing the front side, and a right side (R) and a left side (L) indicate the sides where the engaging holes 412 are formed. Also in the descriptions below, the orientations or sides of the motherboard 30 and the mounting component 42 are indicated with respect to the sides of the HDD 41. Further, directions in the drawings are represented by arrows F, B, R, and L, a length direction FB indicates a direction along the F-B axis, a width direction LR indicates a direction along the L-R axis, and upward and downward directions indicate the directions that are orthogonal to the length direction FB and the width direction LR.

The HDD connector 411 is provided on the front side surface of the HDD 41. When the HDD 41 is moved with the front side surface facing forward, the HDD connector 411 is connected with a board connector 31 on the motherboard 30.

The mounting component 42 is used to mount the HDD 41 on the motherboard 30 and is fixed to the motherboard 30 with screws 49. The mounting component 42 includes a fixed frame 43 fixed to the motherboard 30 and a sliding frame 44 that is slidably supported by the fixed frame 43. The fixed frame 43 has a substantially-rectangular shape and forms an opening 42a where the HDD 41 is to be placed.

Figure 5:
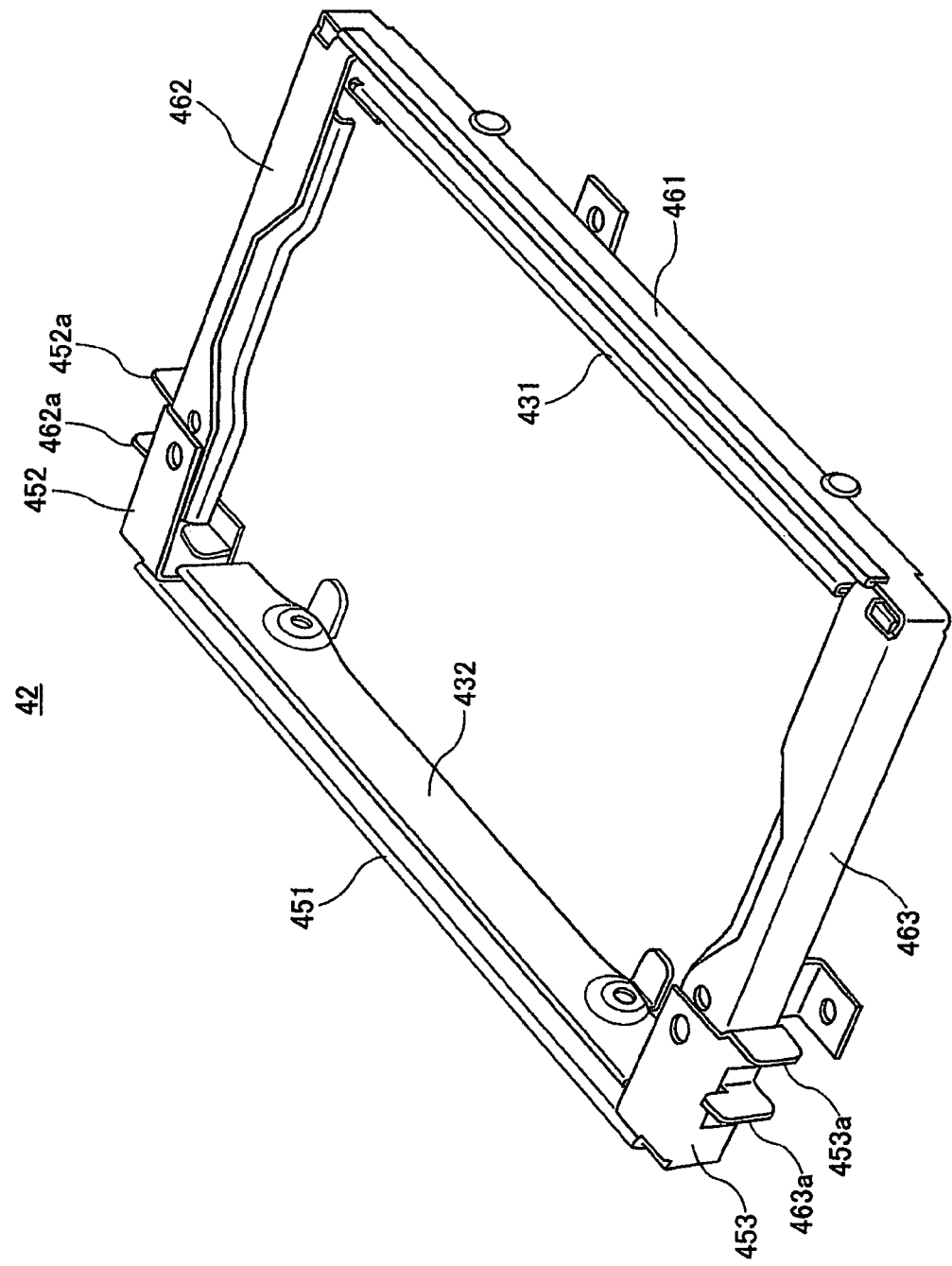
FIG. 5 is a perspective view of the mounting component of FIG. 4.
Figure 6:
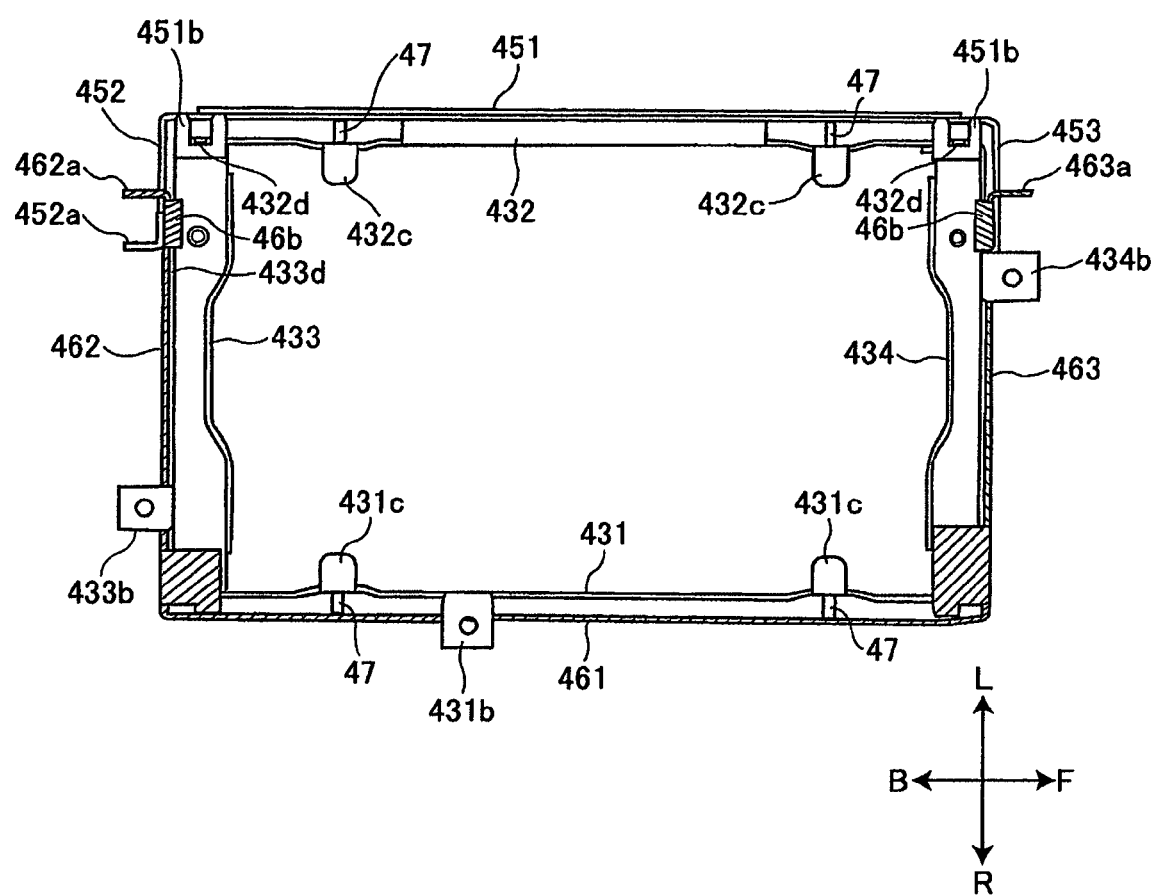
FIG. 6 is a rear view of the mounting component of FIG. 4.
Figure 7:
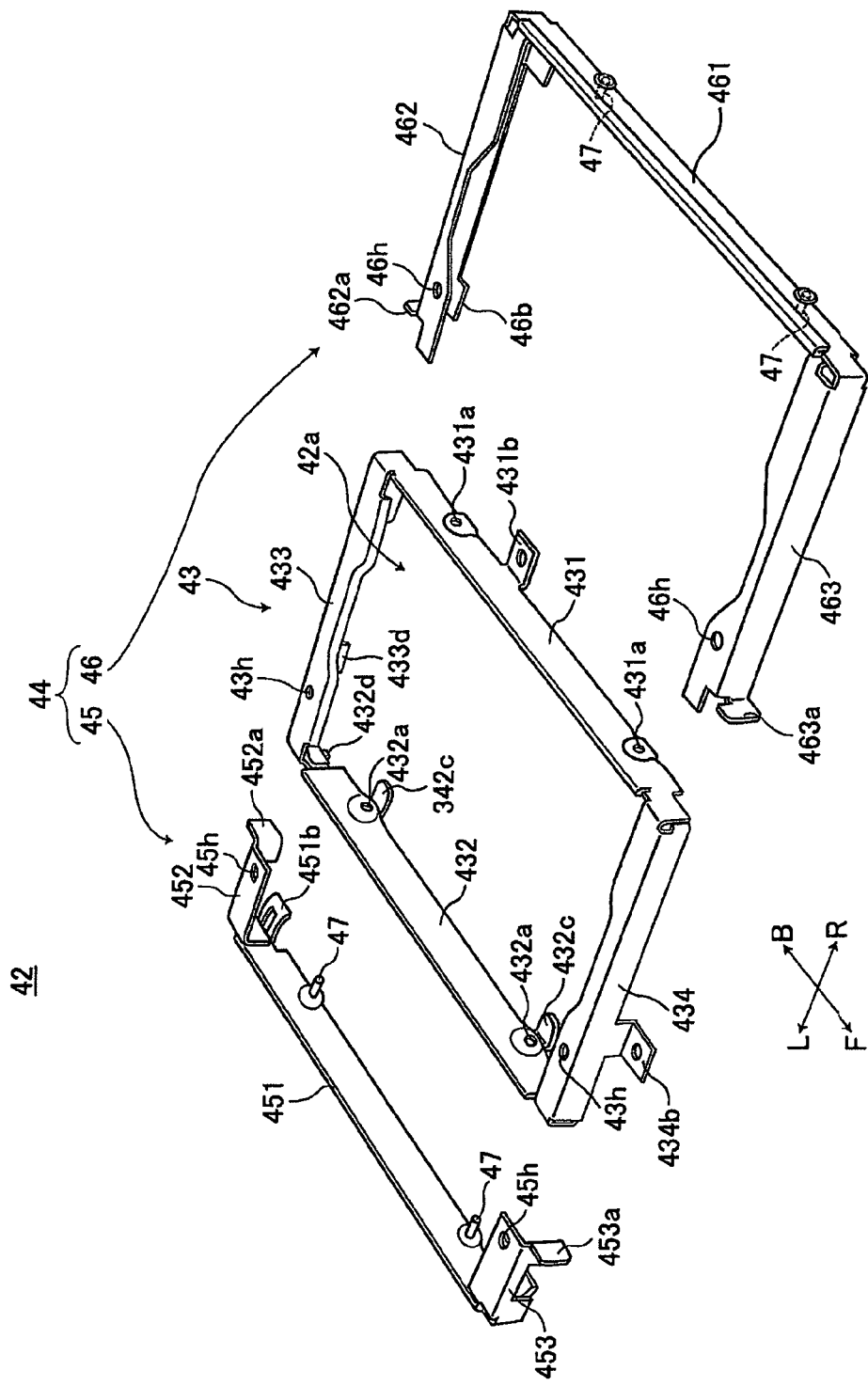
FIG. 7 is an exploded perspective view of the mounting component of FIG. 4.

FIG. 5 is a perspective view of the mounting component 42. FIG. 6 is a rear view of the mounting component 42. FIG. 7 is an exploded perspective view of the mounting component 42.

The mounting component 42 can be locked (or closed) to fix the HDD 41 and can be unlocked (or opened) to mount or remove the HDD 41. FIGS. 4, 5, and 6 illustrate the mounting component 42 that is unlocked.

As illustrated in FIG. 7, the mounting component 42 includes the fixed frame 43 and the sliding frame 44 including a first frame part 45 and a second frame part 46. The fixed frame 43, the first frame part 45, and the second frame part 46 may be formed by punching, folding, or bonding metal plates. In FIG. 6, the second frame part 46 is indicated by hatching to clearly illustrate the arrangement of parts.

The fixed frame 43 includes a pair of fixed side plates 431 and 432 that contact the corresponding sides (side surfaces) of the HDD 41 and a pair of fixed arms 433 and 434 connecting the front ends and the back ends of the fixed side plates 431 and 432. The fixed arms 433 and 434 and the fixed side plates 431 and 432 form the opening 42a where the HDD 41 is to be placed. The fixed side plates 431 and 432 are disposed substantially parallel to each other at a distance that is substantially the same as the width of the HDD 41, i.e., the length of the HDD 41 in the width direction LR. With the HDD 41 placed in the opening 42a, the fixed side plates 431 and 432 contact the corresponding sides of the HDD 41 and fix the position of the HDD 41 in the width direction LR. Meanwhile, the opening 42a formed by the fixed frame 43 has an extra space to allow the HDD 41 to slide in the length direction FB. Two through holes 431a are formed in the fixed side plate 431 and two through holes 432a are formed in the fixed side plate 432 at positions corresponding to the engaging holes 412 of the HDD 41. Fixing legs 431b, 433b, and 434b are formed at lower edges of the fixed side plate 431 and the fixed arms 433 and 434, respectively. The fixing legs 431b, 433b, and 434b are screwed to the motherboard 30 to fix the fixed frame 43 to the motherboard 30. Supporting legs 431c and 432c are formed at lower edges of the fixed side plates 431 and 432 below the through holes 431a and 432a. The supporting legs 431c and 432c are in contact with the motherboard 30 and support the weight of the HDD 41.

The fixed frame 43 also includes two first stoppers 432d and one second stopper 433d for limiting the sliding movement of the sliding frame 44. Details of the first and second stoppers 432d and 433d are described later.

The sliding frame 44 includes a pair of sliding side plates 451 and 461, sliding arms 452 and 453, and sliding arms 462 and 463. The sliding side plates 451 and 461 are disposed at the outer sides of the fixed side plates 431 and 432 of the fixed frame 43. The sliding arms 452 and 453 extend from the back and front ends of the sliding side plate 451 along the fixed arms 433 and 434 of the fixed frame 43. The sliding arms 462 and 463 extend from the back and front ends of the sliding side plate 461 along the fixed arms 433 and 434 of the fixed frame 43. Referring to FIGS. 5 and 6, the sliding arms 453 and 463 disposed at the front side (F) extend toward the opposite sliding side plates 461 and 451 until they (or their ends) partly overlap each other. Similarly, the sliding arms 452 and 462 disposed at the back side (B) extend toward the opposite sliding side plates 461 and 451 until they (or their ends) partly overlap each other. Tabs 452a, 453a, 462a, and 463a are formed at the ends of the sliding arms 452, 453, 462, and 463. The tabs 452a, 453a, 462a, and 463a are bent outward and extend in the length direction FB.

Referring to FIG. 7, two engaging pins 47 are formed on each of the sliding side plates 451 and 461 (four engaging pins 47 in total). The engaging pins 47 are positioned such that when the sliding side plates 451 and 461 are slid (or moved) toward each other from unlocked positions illustrated in FIG. 6, the engaging pins 47 pass through the through holes 431a and 432a and fit into the engaging holes 412 of the HDD 41.

Protrusions 46b are formed at the lower edges of the sliding arms 462 and 463 of the second frame part 46. The protrusions 46b are positioned near the ends of the sliding arms 462 and 463 and protrude toward the opposite sliding arms 462 and 463. The cross sections of the sliding arms 462 and 463 at positions where the protrusions 46b are formed have a substantially U-shape. The second frame part 46 is attached to the fixed frame 43 such that the U-shaped portions of the sliding arms 462 and 463 surround the corresponding fixed arms 433 and 434. With the second frame part 46 attached to the fixed frame 43, the tips of the engaging pins 47 of the sliding side plate 461 are in the through holes 431a of the fixed side plate 431. With this configuration, the second frame part 46 is supported by the fixed frame 43 so as to be able to slide in the width direction LR.

Protrusions 451b are formed at the lower edge of the sliding plate 451. The protrusions 451b are positioned near the ends of the sliding plate 451 and protrude in the directions where the sliding arms 452 and 453 extend. Each of the protrusions 451b has an elongated hole. The cross sections of the first frame part 45 at positions where the protrusions 451b are formed have a substantially U-shape. The first frame part 45 is attached to the fixed frame 43 such that the U-shaped portions of the first frame part 45 surround the corresponding fixed arms 433 and 434. With the first frame part 45 attached to the fixed frame 43, the tips of the engaging pins 47 of the sliding side plate 451 are in the through holes 432a of the fixed side plate 432. With this configuration, the first frame part 45 is supported by the fixed frame 43 so as to be able to slide in the width direction LR.

The first stoppers 432d of the fixed frame 43 engage the protrusions 451b (i.e., the movement of the first stoppers 432d is limited by the elongated holes of the protrusions 451b) and prevent the sliding side plate 451 from being slid away from the fixed side plate 432 more than a predetermined distance. The protrusion 46b of the sliding arm 462 engages the second stopper 433d and the protrusion 46b of the sliding arm 463 engages the fixing leg 434b. This configuration prevents the sliding side plate 461 from being slid away from the fixed side plate 431 more than the predetermined distance. Thus, the sliding distances of the sliding side plates 451 and 461 of the sliding frame 44 are limited. The predetermined distance is substantially the same as the length of the engaging pins 47.

Screw holes 43h, 45h, and 46h are formed in the fixed frame 43, the first frame part 45, and the second frame part 46.

Figure 8:
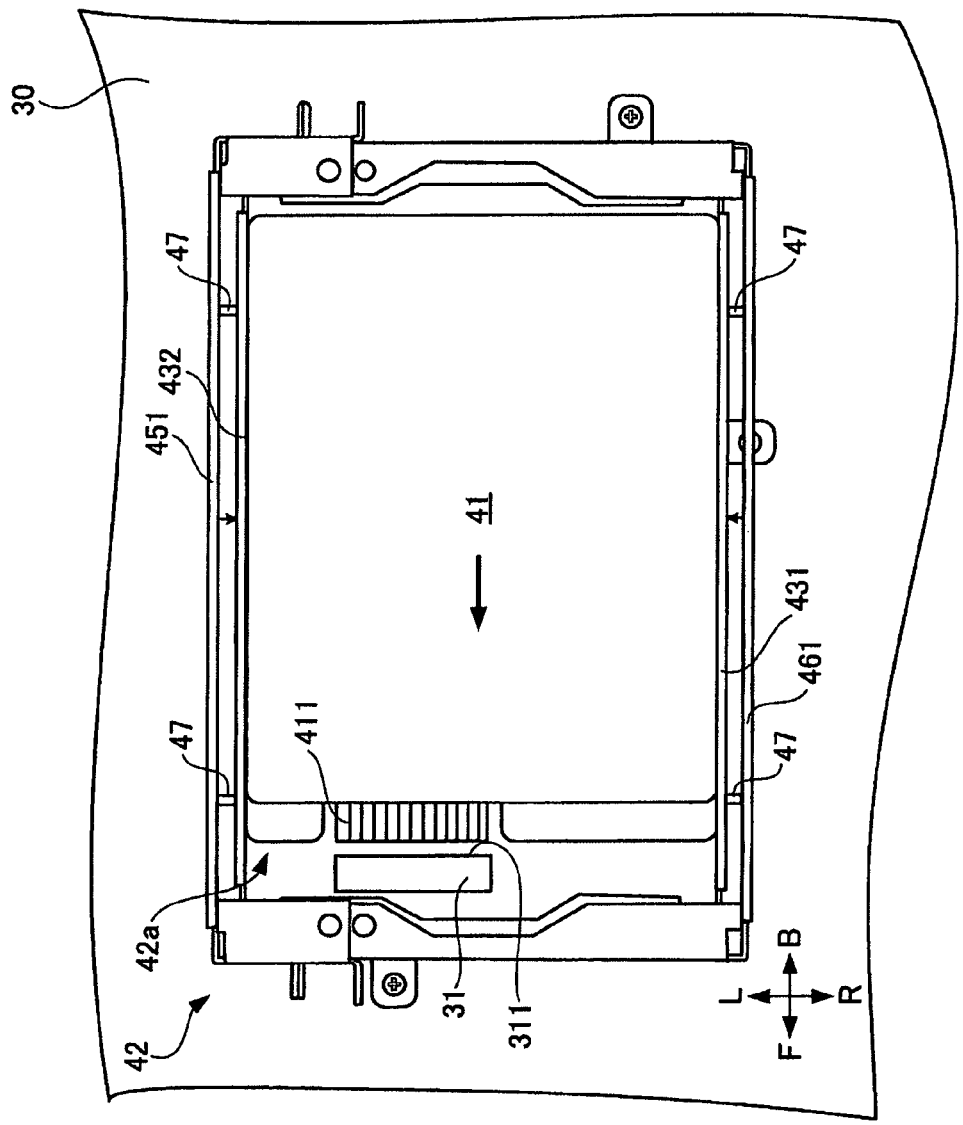
FIG. 8 is a drawing illustrating the mounting component of FIG. 4 that is unlocked.
Figure 9:
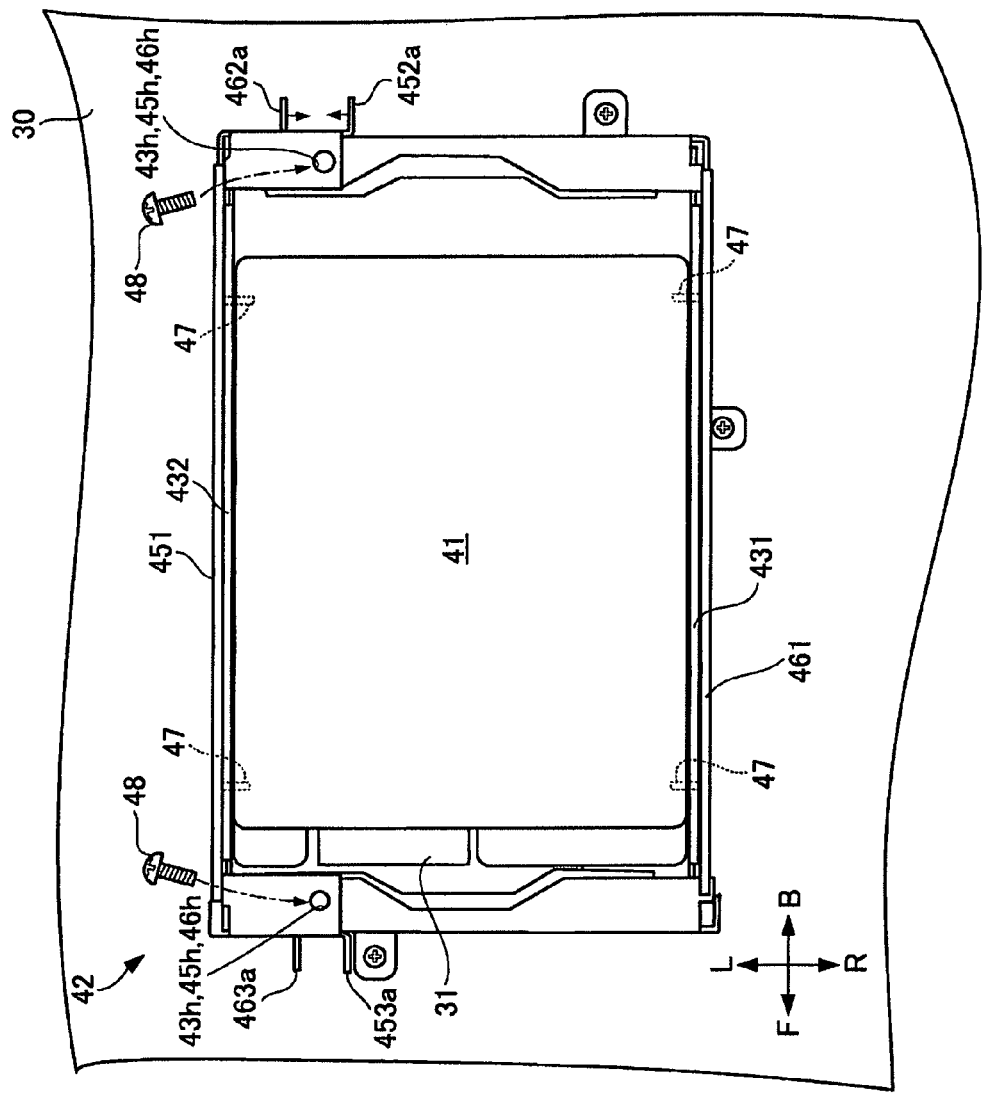
FIG. 9 is a drawing illustrating the mounting component of FIG. 4 that is locked.

A method of mounting the HDD 41 with the mounting component 42 is described below with reference to FIGS. 8 and 9. FIG. 8 illustrates the mounting component 42 that is unlocked and FIG. 9 illustrates the mounting component 42 that is locked.

When the mounting component 42 is unlocked, the sliding side plates 451 and 461 are apart from the corresponding fixed side plates 432 and 431 as illustrated in FIG. 8. Also in FIG. 8, the engaging pins 47 of the sliding side plates 451 and 461 do not protrude via the through holes 432a and 431a of the fixed side plates 432 and 431 into the opening 42a. Accordingly, when the mounting component 42 is unlocked, the HDD 41 can be placed into and removed from the opening 42a of the mounting component 42. Still, when the HDD 41 is in the opening 42a, the fixed side plates 431 and 432 are in contact with the corresponding sides of the HDD 41 and the position of the HDD 41 in the width direction LR is fixed. Meanwhile, the HDD 41 can be slid in the length direction FB.

Various electronic components such as a CPU are mounted on the motherboard 30 to which the mounting component 42 is fixed. The board connector 31 is one of the electronic components and is to be connected with the HDD connector 411 of the HDD 41. The board connector 31 is positioned at the front end of the opening 42a formed by the mounting component 42. A connecting face 311 of the board connector 31 faces the back end of the opening 42a.

When the HDD 41 is slid in the direction F along the fixed side plates 431 and 432, the HDD connector 411 is connected with the board connector 31 fixed to the motherboard 30. Since the HDD 41 is guided by the fixed side plates 431 and 432, the HDD connector 411 is accurately positioned with respect to the board connector 31 and can be reliably connected with the board connector 31.

When the HDD 41 is slid to a position where the HDD connector 411 and the board connector 31 are connected, the engaging holes 412 of the HDD 41 are placed in positions corresponding to the through holes 431a and 432a of the fixed side plates 431 and 432.

When the sliding side plates 451 and 461 are slid (or moved) toward each other with the HDD connector 411 and the board connector 31 connected to each other, the sliding side plates 451 and 461 contact the corresponding fixed side plates 432 and 431 as illustrated in FIG. 9. As a result, the engaging pins 47 of the sliding side plates 451 and 461 are inserted via the through holes 431a and 432a into the engaging holes 412 of the HDD 41, and the mounting component 42 is locked as illustrated in FIG. 9. With the mounting component 42 locked, the HDD 41 is fixed on the motherboard 30.

Also when the mounting component 42 is locked, the screw holes 43h of the fixed arms 433 and 434, the screw holes 45h of the sliding arms 452 and 453, and the screw holes 46h of the sliding arms 462 and 463 overlap each other. The sliding frame 44 is fixed to the fixed frame 43 by inserting screws 48 through the overlapping screw holes 43h, 45h, and 46h to prevent the sliding frame 44 from being unintentionally moved and thereby to prevent the mounting component 42 from being unlocked.

To remove the HDD 41 from the mounting component 42 that is locked as illustrated in FIG. 9, the screws 48 are removed first. Next, the tabs 452a and 462a are pinched between fingers of one hand and the tabs 453a and 463a are pinched between fingers of the other hand to reduce the distance between the tabs 452a and 462a and the distance between the tabs 453a and 463a. When the distance between the tabs 452a and 462a and the distance between the tabs 453a and 463a are reduced, the sliding side plates 451 and 461 slide (or move) away from the corresponding fixed side plates 432 and 431. As a result, the mounting component 42 is unlocked as illustrated in FIG. 8.

When the sliding side plates 451 and 461 are slid in the directions to unlock the mounting component 42, the first stoppers 432d of the fixed frame 43 engage the protrusions 451b of the sliding side plate 451. This configuration prevents the sliding side plate 451 from being slid away from the fixed side plate 432 more than a distance that is substantially the same as the length of the engaging pins 47. Meanwhile, the second stopper 433d engages the protrusion 46b of the sliding arm 462 and the fixing leg 434b engages the protrusion 46b of the sliding arm 463. This configuration prevents the sliding side plate 461 from being slid away from the fixed side plate 431 more than a distance that is substantially the same as the length of the engaging pins 47. Thus, the sliding side plates 451 and 461 can be slid away from the fixed side plates 432 and 431 within a predetermined distance by just operating the tabs 452a and 462a and the tabs 453a and 463a. In other words, the mounting component 42 can be easily unlocked by just pinching the tabs 452a and 462a and the tabs 453a and 463a with fingers.

When the HDD 41 is slid in the direction B while the mounting component 42 is unlocked, the HDD connector 411 is disconnected from the board connector 31 and the HDD 41 can be removed from the mounting component 42.

In the above embodiment, the sliding frame 44 is fixed with the screws 48 to the fixed frame 43. However, other parts such as pins or wires may be used to prevent the mounting component 42 from being unlocked. In this case, the diameter of the pins or the wires may be smaller than the diameter of the screw holes 43h, 45h, and 46h because of the reasons described below.

When the mounting component 42 is locked, the position of the HDD 41 in the length direction FB and the upward and downward directions is fixed by the engaging pins 47 and the position of the HDD 41 in the width direction LR is fixed by the fixed side plates 431 and 432. Therefore, even if the sliding side plates 451 and 461 are slid away from the fixed side plates 432 and 431, as long as the engaging pins 47 are in the engaging holes 412 of the HDD 41, the position of the HDD 41 in the length direction FB and the upward and downward directions is fixed by the engaging pins 47 and the position of the HDD 41 in the width direction LR is fixed by the fixed side plates 431 and 432. In other words, even if the sliding side plates 451 and 461 are moved slightly away from the fixed side plates 432 and 431, the HDD 41 is securely held by the mounting component 42.

For the above reasons, the sliding frame 44 may be fixed to the fixed frame 43 by inserting pins or wires having a diameter that is less than the diameter of the screw holes 43h, 45h, and 46h.

Also, any methods or parts other than those described above may be used to fix the sliding frame 44 to the fixed frame 43. For example, parts for preventing the movement of the sliding side plates 451 and 461 of the sliding frame 44 may be provided to the right and left of the mounting component 42.

Figure 10:
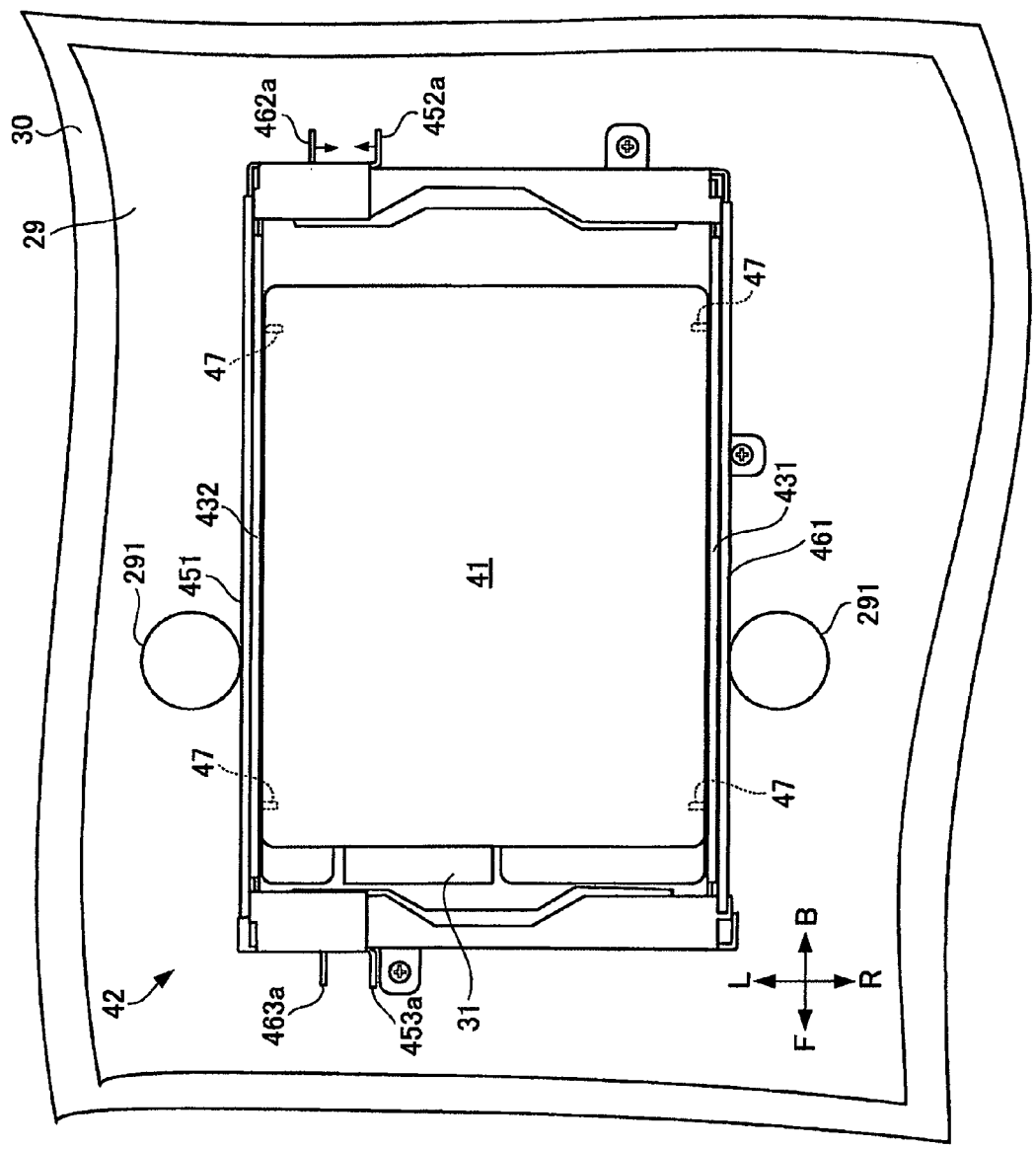
FIG. 10 is a drawing illustrating a variation of the embodiment.

FIG. 10 is a drawing illustrating a variation of the above embodiment where the sliding side plates 451 and 461 are held in position by parts provided to the right and left of the mounting component 42.

In this variation, a pair of holding protrusions 291 is provided on the rear cover 29 (see FIG. 2) so as to sandwich the mounting component 42 from the right and left sides. With this configuration, the rear cover 29 is attached to the main body 20 after the mounting component 42 is locked by bringing the sliding side plates 451 and 461 into contact with the fixed side plates 432 and 431. With the rear cover 29 attached, the holding protrusions 291 sandwich the mounting component 42 and prevent the sliding side plates 451 and 461 from moving away from the fixed side plates 432 and 431 to such an extent that the mounting component 42 is unlocked. Thus, this configuration makes it possible to prevent the mounting unit 42 from being unlocked without using screws. Since the HDD 41 can be held in position even if the sliding side plates 451 and 461 are moved away from the fixed side plates 432 and 431 to such an extent that the mounting component 42 is not unlocked, the positional accuracy of the holding protrusions 291 and the assembly accuracy of the rear cover 29 may not greatly influence the effectiveness of the above configuration.

In the above embodiment, the HDD 41 is used as an example of an electronic component. However, the present invention may also be applied to any other electronic components such as an optical disk drive, a flexible disk drive, and an electronic circuit module.

Also in the above embodiment, the PC 10 is used as an example of an electronic apparatus. However, the present invention may also be applied to any other electronic apparatuses such as business equipment including a disk drive or an electronic circuit module and home appliances such as a video recorder.

In the above embodiment, the position of an electronic component in the width direction is fixed by fixed side plates of a fixed frame and the position of the electronic component in the length direction and in the upward and downward directions is fixed by engaging pins inserted into engaging holes of the electronic component. With this configuration, the electronic component can be held in position as long as the engaging pins are in the engaging holes even if sliding side plates come loose. Also with this configuration, the electronic component can be removed from the mounting component by just moving the sliding side plates away from the fixed side plates to such an extent that the engaging pins come out of the engaging holes. Compared with a configuration where an electronic component is fixed with screws, the above embodiment makes it easier to mount and remove an electronic component.

Thus, an aspect of this disclosure provides a mounting component and an electronic apparatus that make it possible to securely fix and easily mount and replace an electronic component.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A mounting component for mounting an electronic component on a board, the mounting component comprising:
   a fixed frame to be fixed to the board, the fixed frame including
      first and second fixed side plates having through holes formed in positions corresponding to engaging holes formed in side surfaces of the electronic component, and
      first and second fixed arms configured to connect front ends and back ends of the first and second fixed side plates; and
   a sliding frame, the sliding frame including
      first and second sliding side plates disposed at outer sides of the corresponding first and second fixed side plates and including engaging pins that are to be inserted into the engaging holes of the electronic component via the through holes of the first and second fixed side plates,
      first and second sliding arms that extend from front and back ends of the first sliding side plate toward the second sliding side plate, and
      third and fourth sliding arms that extend from front and back ends of the second sliding side plate toward the first sliding side plate;
   wherein the first, second, third, and fourth sliding arms are configured to slide the first and second sliding plates away from the first and second fixed side plates.

2. The mounting component as claimed in claim 1, wherein the first and second fixed side plates are configured to contact the side surfaces of the electronic component to fix a position in a width direction of the electronic component.

3. The mounting component as claimed in claim 1, wherein the first and second fixed side plates and the first and second fixed arms are configured to form an opening where the electronic component is to be placed.

4. The mounting component as claimed in claim 1, wherein
   the first sliding arm and the third sliding arm partly overlap each other and first and third tabs are formed at ends of the first sliding arm and the third sliding arm;
   the second sliding arm and the fourth sliding arm partly overlap each other and second and fourth tabs are formed at ends of the second sliding arm and the fourth sliding arm; and
   the first and third tabs are configured to be moved toward each other and the second and fourth tabs are configured to be moved toward each other to slide the first and second sliding plates away from the first and second fixed side plates.

5. The mounting component as claimed in claim 1, wherein the fixed frame further includes stoppers configured to prevent the first and second sliding side plates from being slid away from the first and second fixed side plates more than a predetermined distance.

6. The mounting component as claimed in claim 1, wherein the electronic component has a substantially-rectangular plate-like shape in plan view.

7. An electronic apparatus, comprising:
a board; and
a mounting component configured to mount an electronic component on the board,
wherein the mounting component includes
a fixed frame to be fixed to the board, the fixed frame including
first and second fixed side plates having through holes formed in positions corresponding to engaging holes formed in side surfaces of the electronic component, and
first and second fixed arms configured to connect front ends and back ends of the first and second fixed side plates; and
a sliding frame, the sliding frame including
first and second sliding side plates disposed at outer sides of the corresponding first and second fixed side plates and including engaging pins that are to be inserted into the engaging holes of the electronic component via the through holes of the first and second fixed side plates,
first and second sliding arms that extend from front and back ends of the first sliding side plate toward the second sliding side plate, and
third and fourth sliding arms that extend from front and back ends of the second sliding side plate toward the first sliding side plate;
wherein the first, second, third, and fourth sliding arms are configured to slide the first and second sliding plates away from the first and second fixed side plates.

8. The electronic apparatus as claimed in claim 7, wherein the first and second fixed side plates are configured to contact the side surfaces of the electronic component to fix a position in a width direction of the electronic component.

9. The electronic apparatus as claimed in claim 7, wherein the first and second fixed side plates and the first and second fixed arms are configured to form an opening where the electronic component is to be placed.

10. The electronic apparatus as claimed in claim 7, wherein
the first sliding arm and the third sliding arm partly overlap each other and first and third tabs are formed at ends of the first sliding arm and the third sliding arm;
the second sliding arm and the fourth sliding arm partly overlap each other and second and fourth tabs are formed at ends of the second sliding arm and the fourth sliding arm; and
the first and third tabs are configured to be moved toward each other and the second and fourth tabs are configured to be moved toward each other to slide the first and second sliding plates away from the first and second fixed side plates.

11. The electronic apparatus as claimed in claim 7, wherein the fixed frame further includes stoppers configured to prevent the first and second sliding side plates from being slid away from the first and second fixed side plates more than a predetermined distance.

12. The electronic apparatus as claimed in claim 7, wherein the electronic component has a substantially-rectangular plate-like shape in plan view.

* * * * *